(12) United States Patent
Neuenschwander

(10) Patent No.: US 10,637,239 B2
(45) Date of Patent: Apr. 28, 2020

(54) UTILITY NETWORK MONITORING DEVICE

(71) Applicant: Honeywell International Inc., Morris Plains, NJ (US)

(72) Inventor: Victoria Neuenschwander, Cary, NC (US)

(73) Assignee: Honeywell International Inc., Morris Plains, NJ (US)

( * ) Notice: Subject to any disclaimer, the term of this patent is extended or adjusted under 35 U.S.C. 154(b) by 19 days.

(21) Appl. No.: 16/159,601

(22) Filed: Oct. 12, 2018

(65) Prior Publication Data
US 2019/0115754 A1 Apr. 18, 2019

Related U.S. Application Data

(60) Provisional application No. 62/572,357, filed on Oct. 13, 2017.

(51) Int. Cl.
| | |
|---|---|
| *H02J 3/00* | (2006.01) |
| *G01L 5/04* | (2006.01) |
| *G01M 5/00* | (2006.01) |
| *G06Q 50/06* | (2012.01) |
| *G01D 4/00* | (2006.01) |

(52) U.S. Cl.
CPC ............... *H02J 3/00* (2013.01); *G01L 5/04* (2013.01); *G01M 5/0025* (2013.01); *G06Q 50/06* (2013.01); *G01D 4/004* (2013.01); *H02J 2003/001* (2013.01); *H02J 2003/002* (2013.01); *H02J 2003/003* (2013.01)

(58) Field of Classification Search
CPC ......... G06Q 50/06; G01L 5/04; G01L 5/0025; H02J 2003/001; H02J 2003/003
See application file for complete search history.

(56) References Cited

U.S. PATENT DOCUMENTS

| | | | |
|---|---|---|---|
| 7,986,246 B2 | 7/2011 | Angelis et al. | |
| 2009/0216472 A1* | 8/2009 | Zima ..................... | H02H 6/00 702/65 |
| 2010/0114392 A1* | 5/2010 | Lancaster ............... | H02J 3/00 700/292 |
| 2010/0330919 A1* | 12/2010 | Gurney ................ | H04W 52/367 455/67.11 |

(Continued)

FOREIGN PATENT DOCUMENTS

| | | |
|---|---|---|
| CN | 102042885 B | 5/2012 |
| WO | 2013033576 A1 | 3/2013 |

(Continued)

OTHER PUBLICATIONS

Zhou et al., "Robust Real-Time UAV Based Power Line Detection and Tracking," IEEE, pp. 744-748, 2016.

(Continued)

*Primary Examiner* — Vincent H Tran

(57) ABSTRACT

A device for monitoring a component of a utility network configured to access characteristic data associated with the component and a geographical region where the component is located, generate an operation model for the component, access sensor data for the component, identify a physical strain on the component, identify whether operation of the component is affected by the physical strain, and update the operation model for the component.

20 Claims, 6 Drawing Sheets

(56) References Cited

U.S. PATENT DOCUMENTS

| | | | |
|---|---|---|---|
| 2012/0065803 A1* | 3/2012 | Teichmann | H02J 3/385 |
| | | | 700/297 |
| 2013/0054162 A1 | 2/2013 | Smith et al. | |
| 2014/0074670 A1 | 3/2014 | Garrity et al. | |
| 2014/0379303 A1 | 12/2014 | Chandrashekaraiah et al. | |
| 2015/0131079 A1 | 5/2015 | Heinonen et al. | |
| 2015/0355144 A1* | 12/2015 | Bartuli | G01N 29/12 |
| | | | 73/579 |
| 2016/0216710 A1* | 7/2016 | Hu | G08G 5/0069 |
| 2017/0082665 A1 | 3/2017 | Bandyopadhyay et al. | |
| 2018/0299495 A1 | 10/2018 | Abbas | |

FOREIGN PATENT DOCUMENTS

| | | |
|---|---|---|
| WO | 2016049369 A1 | 3/2016 |
| WO | 2016122966 A1 | 8/2016 |
| WO | 2017115341 A1 | 7/2017 |

OTHER PUBLICATIONS

International Search Report and Written Opinion for Application No. PCT/US2018/055753, 14 pages, dated Dec. 13, 2018.
International Search Report and Written Opinion for Application No. PCT/US2018/055751, 12 pages, dated Jan. 22, 2019.
International Search Report and Written Opinion for Application No. PCT/US2018/055748, 14 pages, dated Jan. 29, 2019.

* cited by examiner

UTILITY NETWORK MONITORING DEVICE

This application claims the benefit of U.S. Provisional Patent Application Ser. No. 62/572,357, filed Oct. 13, 2017. U.S. Provisional Patent Application Ser. No. 62/572,357, filed Oct. 13, 2017, is hereby incorporated reference.

TECHNICAL FIELD

The disclosure relates generally to utility networks, and more particularly to outage prediction for utility networks.

BACKGROUND

A power outage or power failure is a short-term or a long-term loss of the electric power to a particular area. There are many causes of power outages in a utility/electricity network. These causes may include faults at utility premises/power stations, damage to electric transmission lines, substations or other parts of the distribution system, a short circuit, or the overloading of electricity mains. Power outages are particularly critical at sites where the environment and public safety are at risk, such as hospitals, sewage treatment plants, mines, shelters and the like. Other critical systems, such as telecommunications, may also be affected by a power outage. Under certain conditions, a utility network component failing or decreasing in operation can cause disturbances in the network that can lead to a cascading failure of a larger section of the network. This may range from a building, to a block, to an entire city, and/or to an entire electrical grid. Modern utility networks are designed to be resistant to this sort of cascading failure, but it may be unavoidable. What would be desirable is an approach to monitor components of a utility network that would provide real-time alerts and predictions of where and when outages may occur. A technician crew may then be prepared in terms of equipment needs and staging to prevent or lessen the duration of an outage.

SUMMARY

In an example of the disclosure, a device for monitoring a component of a utility network may be configured to access characteristic data associated with the component and a geographical region where the component is located, generate an operation model for the component based on the characteristic data, access sensor data for the component, identify a physical strain on the component based on the sensor data, identify whether operation of the component is affected by the physical strain, and update the operation model for the component based on whether the operation of the component is affected by the physical strain.

Alternatively or additionally to the foregoing, the operation model of the component may have a set of operating and structural conditions.

Alternatively or additionally to any of the embodiments above, the device may be further configured to identify that the physical strain on the component satisfies at least one condition from the set of operating and structural conditions, and send a notification indicating that the at least one condition is satisfied.

Alternatively or additionally to any of the embodiments above, when the physical strain does not satisfy a first corresponding condition from the set of operating and structural conditions, but the operation of the component is affected by the physical strain, the first corresponding condition may be adjusted and when the physical strain satisfies a second corresponding condition, but the operation of the component is not affected by the physical strain, the second corresponding condition may be adjusted.

Alternatively or additionally to any of the embodiments above, the operation model may indicate a likelihood of failure of the component.

Alternatively or additionally to any of the embodiments above, the likelihood of failure may include a confidence score.

Alternatively or additionally to any of the embodiments above, the characteristic data may comprise geological map data, property tax data, weather data, sensor data, and image data.

Alternatively or additionally to any of the embodiments above, the device may be further configured to generate a set of models from the characteristic data, and combine the set of models to create the operation model.

Alternatively or additionally to any of the embodiments above, the set of models may comprise an energy forecasting model, a building occupancy prediction model, time to event prediction model, vegetation growth prediction model, and an oscillation detection model.

Alternatively or additionally to any of the embodiments above, a remote server may generate a set of models from the characteristic data and the device may access the set of models from the remote device and may be further configured to combine the set of models to create the operation model.

In another example of the disclosure, a system for monitoring a component of a utility network may comprise a set of sensors for accumulating sensor data and a device operatively coupled to the set of sensors. The device may also be configured to access characteristic data associated with the component and a geographical region where the component is located, generate an operation model for the component based on the characteristic data, access the sensor data for the component from the set of sensors, identify a physical strain on the component based on the sensor data, identify whether operation of the component is affected by the physical strain, and update the operation model for the component based on whether the operation of the component is affected by the physical strain.

Alternatively or additionally to any of the embodiments above, the operation model of the component may have a set of operating and structural conditions.

Alternatively or additionally to any of the embodiments above, the device may be further configured to identify that the physical strain on the component satisfies at least one condition from the set of operating and structural conditions and sends a notification indicating that the at least one condition is satisfied.

Alternatively or additionally to any of the embodiments above, when the physical strain does not satisfy a first corresponding condition from the set of operating and structural conditions, but the operation of the component is affected by the physical strain, the first corresponding condition may be adjusted, and when the physical strain satisfies a second corresponding condition, but the operation of the component is not affected by the physical strain, the second corresponding condition may be adjusted.

Alternatively or additionally to any of the embodiments above, the operation model may indicate a likelihood of failure of the component.

Alternatively or additionally to any of the embodiments above, the system may further comprise a remote server operatively coupled to the set of the sensors and the device and may be configured to generate a set of models from the characteristic data, and the device may access the set of models from the remote server and combine the set of models to create the operation model.

In another example of the disclosure, a method for monitoring a component of a utility network may comprise accessing characteristic data associated with the component and a geographical region where the component is located, generating an operation model for the component based on the characteristic data, accessing sensor data for the component, identifying a physical strain on the component based on the sensor data, identifying whether operation of the component is affected by the physical strain, and updating the operation model for the component based on whether the operation of the component is affected by the physical strain.

Alternatively or additionally to any of the embodiments above, the operation model of the component may have a set of operating and structural conditions.

Alternatively or additionally to any of the embodiments above, when the physical strain does not satisfy a first corresponding condition from the set of operating and structural conditions, but the operation of the component is affected by the physical strain, the first corresponding condition may be adjusted and when the physical strain satisfies a second corresponding condition, but the operation of the component is not affected by the physical strain, the second corresponding condition may be adjusted.

Alternatively or additionally to any of the embodiments above, the method may further comprise generating a set of models from the characteristic data and combining the set of models to create the operating model.

The above summary of some illustrative embodiments is not intended to describe each disclosed embodiment or every implementation of the present disclosure. The Figures and Description which follow more particularly exemplify these and other illustrative embodiments.

BRIEF DESCRIPTION OF THE FIGURES

The disclosure may be more completely understood in consideration of the following description in connection with the accompanying drawings, in which.

Figure 1:
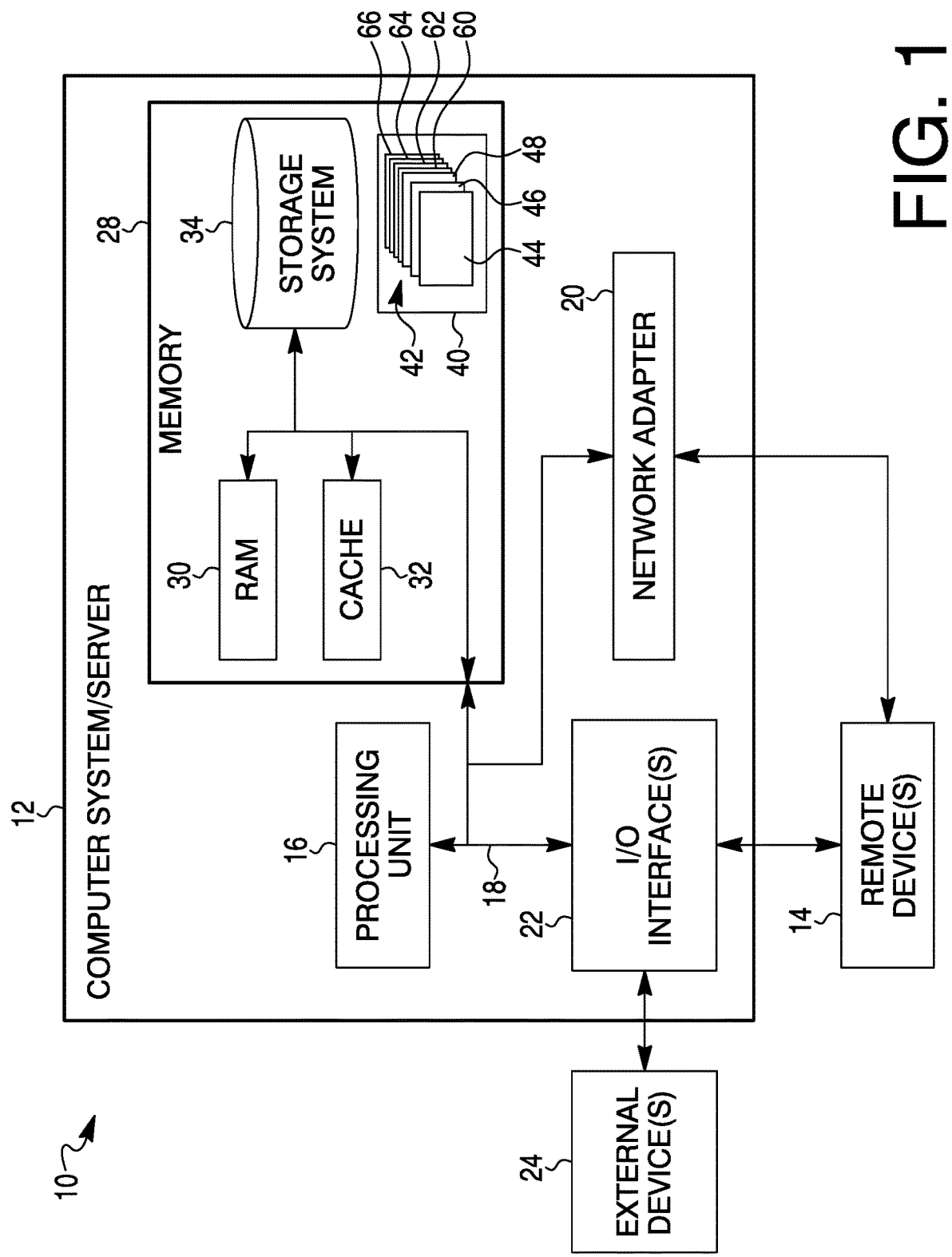
FIG. 1 is a schematic of a cloud computing node.

While the disclosure is amenable to various modifications and alternative forms, specifics thereof have been shown by way of example in the drawings and will be described. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions should be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used in connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure. Although examples of construction, dimensions, and materials may be illustrated for the various elements, those skilled in the art will recognize that many of the examples provided have suitable alternatives that may be utilized.

The current disclosure relates to devices, controllers, systems, computer programs, and methods adapted for monitoring components of a utility network. In some cases, "character" data (e.g., geological map data, property tax data, weather data, sensor data, image data, etc.) associated with the components and/or the geographical region where the components are located may be accessed. In some instances, the character data may be used to generate operation models for the components. In some cases, the operation models may be component fault or failure predictors that may be capable of forecasting deterioration or constraints of the components over time and predict their operating and structural conditions/limitations that, when satisfied by physical strains/force, may cause the components to fail. Additionally, sensor data may be accessed and used to identify the physical strains on the components. In some examples, whether the operation of the components is affected by the physical strains may be identified and the operation models for the components may be updated based on whether operation is affected by the physical strains.

It is understood in advance that although this disclosure includes a detailed description on cloud computing, an implementation of the teachings recited herein is not limited to a cloud computing environment. Rather, embodiments of the present system are capable of being implemented in conjunction with any other type of device or computing environment now known or later developed. Cloud computing may be a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Moreover, a cloud computing environment may be service oriented with a focus on statelessness, low coupling, modularity, and semantic interoperability. At the heart of cloud computing may be an infrastructure comprising a network of interconnected nodes.

FIG. 1 depicts a schematic of an example of a cloud computing node 10. The cloud computing node 10 is only one example of a suitable cloud computing node and is not intended to suggest any limitation as to the scope of use or functionality of embodiments described herein. Regardless, the cloud computing node 10 may be capable of being implemented and/or performing any of the functionalities set forth herein.

In the cloud computing node 10, there may be a device 12 for monitoring a component of a utility network. In some cases, the device 12 may be a computer system/server that may be operational with numerous other general purpose or special purpose computing system environments or configurations. Examples of well-known computing systems, environments, and/or configurations that may be suitable for use with the device 12 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The device 12 may be described in the general context of computer system executable instructions, such as program modules, being executed by a computer system. Generally, program modules may include routines, programs, objects, components, logic, data structures, and so on that perform particular tasks or implement particular abstract data types. The device 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the device 12 in cloud computing node 10 is shown in the form of a general-purpose computing device. The components of the device 12 may include, but are not limited to, one or more processors or processing units 16, a system memory 28, and a bus 18 that couples various system components including system memory 28 to the processor 16.

The bus 18 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

In some instances, the processing unit 16 may include a pre-programmed chip, such as a very-large-scale integration (VLSI) chip and/or an application specific integrated circuit (ASIC). In such embodiments, the chip may be pre-programmed with control logic in order to control the operation of the device 12. In some cases, the pre-programmed chip may implement a state machine that performs the desired functions. By using a pre-programmed chip, the processing unit 16 may use less power than other programmable circuits (e.g. general purpose programmable microprocessors) while still being able to maintain basic functionality. In other instances, the processing unit 16 may include a programmable microprocessor. Such a programmable microprocessor may allow a user to modify the control logic of the device 12 even after it is installed in the field (e.g., firmware update), which may allow for greater flexibility of the device 12 in the field over using a pre-programmed ASIC.

The device 12 may include a variety of computer system readable media. Such media may be any available media that is accessible by the device 12, and it includes both volatile and non-volatile media, removable and non-removable media.

The System memory 28 can include computer system readable media in the form of volatile memory, such as random access memory (RAM) 30 and/or cache memory 32. The device 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, EPROM, flash memory (e.g., NAND flash memory), an external SPI flash memory or other optical media can be provided. In such instances, each can be connected to the bus 18 by one or more data media interfaces. As will be further depicted and described below, memory 28 may include at least one program product having a set (e.g., at least one) of program modules (e.g., software) that are configured to carry out the functions of embodiments of the system.

Program/utility 40, having a set (e.g., at least one) of program modules 42, may be stored in memory 28 by way of example, and not limitation, as well as an operating system, one or more application programs (e.g., an Outage Management System Application (OMS) 44, a Computer Information System (CIS) Application 46, a Geographic Information System Application (GIS) 48, a Supervisory Control and Data Acquisition Application (SCADA) 60, a WOMS Application 62, a Home Electronic System Application (HES) 64, and an Meter Data Management Application (MDM) 66, etc.), other program modules, and program data. Each of the operating system, one or more application programs, other program modules, and program data or some combination thereof, may include an implementation of a networking environment. Program modules 42 generally carry out the functions and/or methodologies of embodiments of the system as described herein. In some cases, the program modules 42 and/or the application programs (e.g., the OMS 44, the CIS 46, the GIS 48, the SCADA 60, the WOMS 62, the HES 64, and the MDM 66) may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The device 12 may also communicate with one or more external devices 24 such as a keyboard, a pointing device, a display, etc.; one or more devices that enable a user to interact with the device 12; and/or any devices (e.g., network card, modem, etc.) that enable the device 12 to communicate with one or more other remote devices 14 such as, for example, a smart phone, tablet computer, laptop computer, personal computer, PDA, and/or the like. Such communication with the external device 24 can occur via Input/Output (I/O) interfaces 22. Still yet, the device 12 can communicate with the external devices 24 and/or the remote devices 14 over one or more networks such as a local area network (LAN), a general wide area network (WAN), and/or a public network (e.g., the Internet) via network adapter 20. As depicted, the I/O interfaces 22 and the network adapter 20 communicate with the other components of the device 12 via bus 18. In some cases, the remote devices 14 may provide a primary and/or a secondary user interface for the user to interact with the device 12. In some cases, the device 12 may utilize a wireless protocol to communicate with the remote devices 14 over the network.

In some instances, the OMS 44 and the MDM 66 may execute entirely on the device 12, as a stand-alone software package, and/or partly on the device 12 and partly on the remote devices 14. For example, the OMS 44 may provide instructions to the processing unit 16 to access characteristic data. In some examples, the characteristic data may also be stored locally on the device 12, partially on the device 12 and partially on an external computing architecture/environment, or fully on an external computing architecture/environment (e.g., a remote server). In some cases, the characteristic data may be associated with a component of a utility network and a geographical region where the component is located. For instance, the characteristic data may refer to information produced as result of environmental conditions, such as, real-time and historical weather conditions, landscape conditions, vegetation conditions, etc. Additionally, the characteristic data may also refer to information produced as a result of actions on the component that may deteriorate its condition. For example, the component may be a distribution line. As such, the characteristic data may refer to the motion or movement of the distribution line. In another example, the characteristic data may refer to the electricity that runs through the distribution line. In yet further examples, the characteristic data may be a combination of environmental conditions and actions on the component. That is, the environmental conditions may affect and/or alter how the component experiences the actions. For instance, elevated wind gusts may occur near the distribution line. However, the distribution line may be at the bottom of a hill so the distribution line may not experience the elevated wind gusts and therefore, may not experience elevated motion or movement. In some cases, the characteristic data may track these environmental conditions and actions and be recorded and the characteristic data may then be accessed using a range of devices connected to a network (e.g., the Internet), such as the device 12, a PC, tablet, smartphone, for example.

In some cases, the characteristic data may permit the OMS 44/device 12 to identify which characteristic data is pertinent for the component and group the data accordingly. For example, the OMS 44 may take distinct characteristic data for the component, grouped according to their separate datasets (e.g., characteristic data originating from meter devices, segmentation based characteristic data, characteristic data originating from eCommerce platforms, characteristic data originating from web applications, characteristic data originating from weather platforms, etc.), and generate a set of models from the grouped data. The OMS 44 may then provide instructions to the processing unit 16 to combine the set of models to create and generate an operation model for the component. In some cases, because the set of models was configured from environmental conditions and actions that the component has been subjected to or will likely be subjected to, the combination of the set of models into the operation model may be a forecaster of the likelihood that the component is fail/stop or decrease in operation. For instance, the component of the utility may be a transmission line. Based on the characteristic data, when the transmission line experiences a sway 0.00005 m/s$^2$, the operation of the transmission line is likely to stop or decrease in operation. As such, the transmission line may have an acceptable line sway range of 0 to 0.00005 m/s$^2$. Moreover, the characteristic data may also indicate that when the transmission line is subject to wind gusts of 35 mph, the transmission line may sway at its maximum acceptable line sway (i.e., a structural condition) of 0.00005 m/s$^2$. Accordingly, the OMS 44 may provide instructions to the processing unit 16 to generate an operation model for the transmission line that indicates that when the transmission line is subject to wind gusts of 35 mph (i.e., an operating condition) and/or the transmission line sways at least 0.00005 m/s$^2$, there is a likelihood that the transmission line may stop or decrease in operation (i.e., the transmission line may fail) and power outages may be likely to occur as a result. As such, when both or either corresponding operating and structural condition is satisfied, the OMS 44 may provide instructions to the processing unit 16 to send a notification to a technician/employee of the utility network that the transmission line may be the cause of the power outages and proper action may then be taken to either prevent the transmission line from causing the power outage or repair the power outage (e.g., repair the transmission line).

In some examples, the MDM 66 may also provide instructions to the processing unit 16 to access sensor data for the component of the utility network. In some examples, the sensor data may also be stored locally on the device 12, partially on the device 12 and partially on an external computing architecture/environment, or fully on an external computing architecture/environment (e.g., a remote server). In some cases, the sensor data may indicate the current physical strain on the component. In some examples, the physical strain may cause the component to deteriorate, damage, break, and/or change its current condition such that the component may be weakened and cannot operate to its former (pre-deteriorated) capacity. In other examples, the physical strain may not affect the component and/or the component may continue to operate. For instance, continuing with the example of the transmission line, in some cases the transmission line may be operatively coupled to a sensor, such as for example, an accelerometer that may be used to sense/detect the motion/force on the transmission line due to the current weather conditions (e.g., wind, storms, etc.). As stated above, the transmission line has an operation model that indicates that when the transmission line is subject to wind gusts of 35 mph and/or the transmission line sways at least 0.00005 m/s$^2$, there is a likelihood that the transmission line may stop or decrease in operation (i.e., the transmission line may fail). In this example, a wind gust of 45 mph is detected and the accelerometer senses that the transmission line sways 0.00006 m/s$^2$. When the processing unit 16 receives this data from the accelerometer (i.e., the processor 16 identifies that the corresponding operating and structural conditions of the operation model for the transmission line are met by the physical strain of the wind), the OMS 44 may provide instructions to the processing unit 16 to send a notification to the technician. However, in this case, the technician may observe that the transmission line did not stop/fail or decrease in operation and no power outages occurred. The technician may then send a report to the device 12 that upon experiencing 45 mph wind gusts and a 0.00006 m/s² line sway, the operation of the transmission line did not decrease or stop and no power outages occurred. In some instances, the OMS 44 may provide instructions to the processing unit 16 to use the report to update the operation model for the transmission line. In other words, the report may provide data that helps purge, standardize, tag, categorize, and summarize the characteristic data properly so that the characteristic data may be used to generate operation models that more accurately predict whether there is a likelihood that a component is going to stop or decrease in operation. Accordingly, in some cases, the device 12 may produce reliable, repeatable descriptive results and predictions and uncover "hidden insights" through historical relationships and trends in the characteristic data. As such, in some examples, the device 12 may be configured to "learn" (e.g., progressively improve the failure prediction of the operation models) from the reports and/or feedback, without being explicitly programmed. For instance, the device 12 may automatically update the operation model to indicate that the new acceptable line sway range of the transmission line is 0 to 0.00006 m/s². Accordingly, when the transmission line is subject to wind gusts of 45 mph and/or the transmission line sways at least 0.00006 m/s², there is a likelihood that the transmission line may stop or decrease in operation (i.e., the transmission line may fail).

It should be understood that although not shown, other hardware and/or software components could be used in conjunction with the device 12. Examples, include, but are not limited to: microcode, device drivers, redundant processing units, external disk drive arrays, RAID systems, tape drives, and data archival storage systems, etc.

Figure 2:
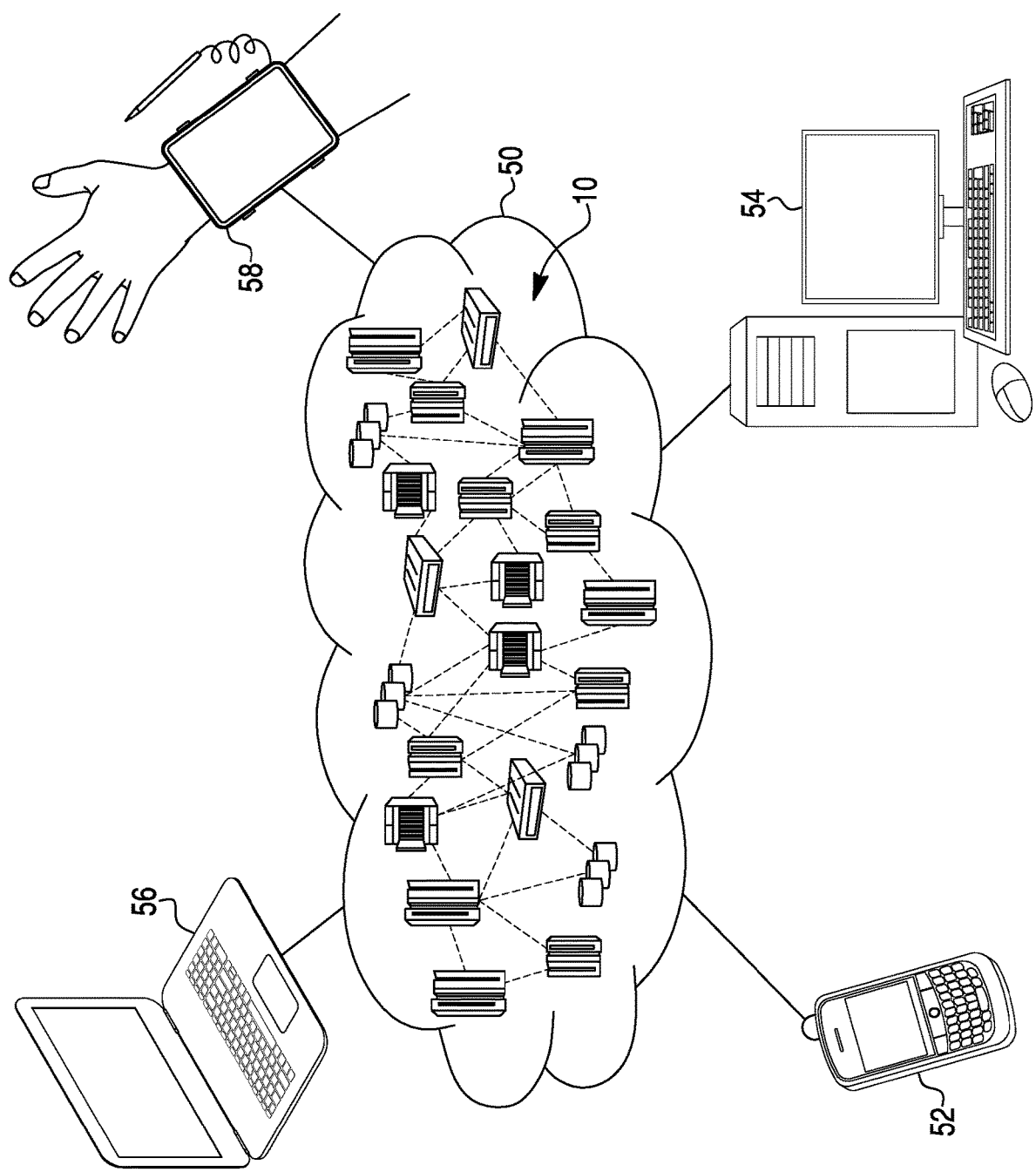
FIG. 2 is an illustrative cloud computing environment.

FIG. 2 depicts an illustrative cloud computing environment 50. As shown, cloud computing environment 50 comprises one or more cloud computing nodes 10 with which cloud consumers (e.g., utility companies, technicians, investigators, general public, etc.) may use local computing devices, such as, for example, personal digital assistant (PDA) or a cellular telephone 52, desktop computer 54, laptop computer 56, and/or a field device 58 may communicate. Nodes 10 may communicate with one another. They may be grouped (not shown) physically or virtually, in one or more networks, such as, for example, Private, Community, Public, or Hybrid clouds, or a combination thereof. This may allow cloud computing environment 50 to offer infrastructure, platforms and/or software (e.g., the NTL Application 44, from FIG. 1) as services for which a cloud consumer does not need to maintain resources on a local computing device. It is understood that the types of computing devices 52, 54, 56, 58 shown in FIG. 3 are intended to be illustrative only and that computing nodes 10 and cloud computing environment 50 can communicate with any type of computerized device over any type of network and/or network addressable connection (e.g., using a web browser).

Figure 3:
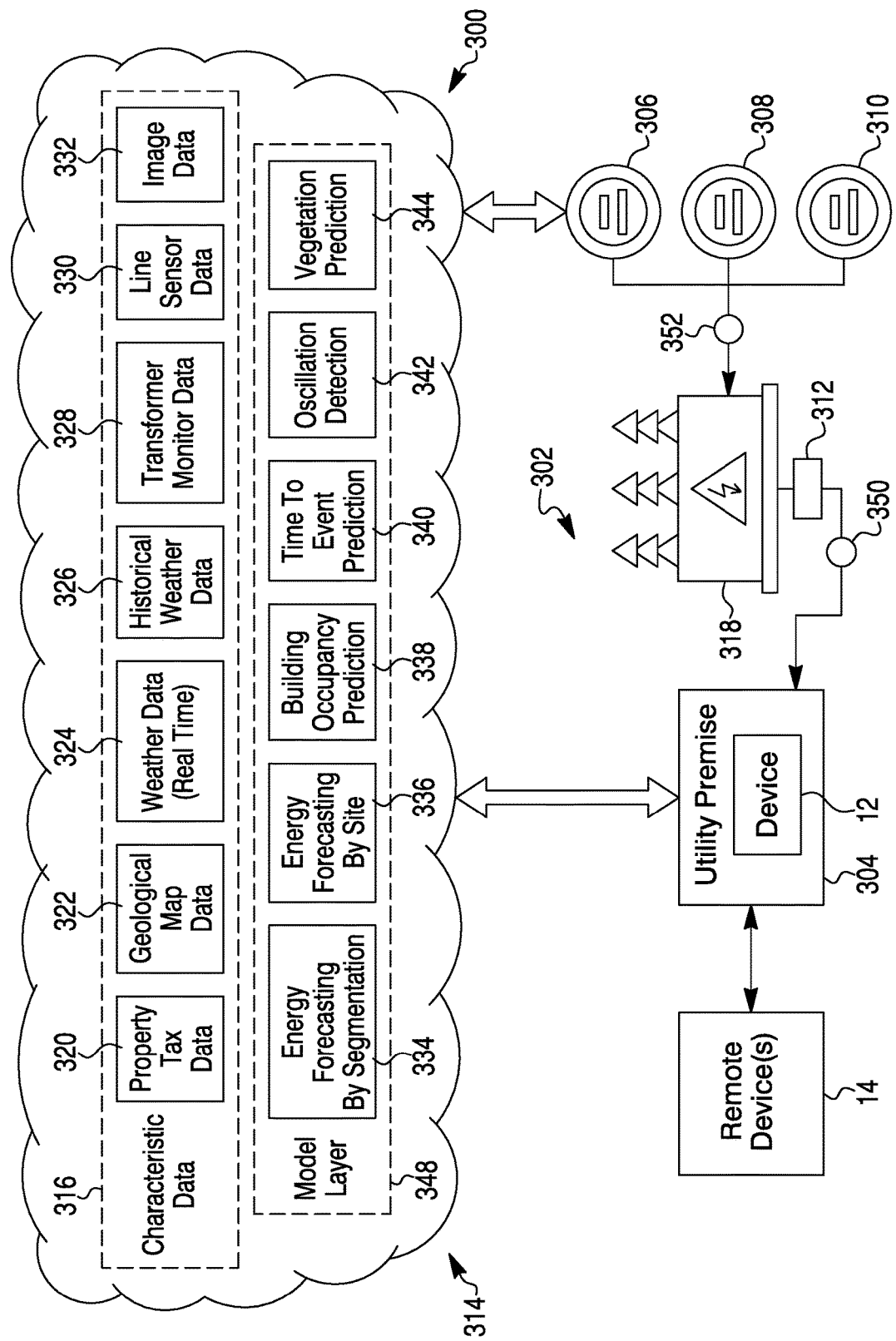
FIG. 3 is an illustrative system for monitoring a component of a utility network.

FIG. 3 depicts an illustrative system 300 for monitoring a component of a utility network 302. As shown in FIG. 3, the utility network 302 may include a utility premise 304 (e.g., a power plant/source) that includes the device 12 and distributes energy (e.g., electricity) across power lines 318 of the utility network 302 to a first utility/structure (or energy consuming entity) that has a metering device 306 which monitors and records the amount of a particular energy being consumed by the utility/structure. A second utility/structure (or energy consuming entity) has a similar metering device 308 associated therewith, and a third utility/structure (or energy consuming entity) likewise has a similar metering device 310 associated therewith. Each of the metering devices 306, 308, 310 maybe operatively coupled to the utility premise 304 so that readings/energy data being taken by the metering devices are transmitted to the device 12 for processing and storage. In some cases, the power lines 318 may include a transformer monitor(s) 312 that monitors and records the amount of a particular energy being distributed to the utilities/structures. The transformer monitor(s) 312 may also be operatively coupled to the utility premise 304 so that readings/energy data being taken by the transformer monitor(s) 312 may be transmitted to the device 12 for processing and storage. While only three metering devices 306, 308, 310, the power line 318, and one transformer monitor 312 is shown in FIG. 3, it should be understood that there can be any number of components included in the utility network 302. Moreover, there may be many different kinds of components present in the utility network including, for example, meters, transformers, distribution lines or poles, transmission towers or lines, substations, transformer stations, etc. Additionally, the utility network 302 may include sensors 350 and 352 operatively coupled to the components for accumulating sensor data. There may be any number of sensors present in the utility network and many different kinds including, for example, accelerometers, infrared (IR) sensors, temperature sensors, multimeters, pressure sensors, optical/visual sensors, etc., that may be used to accumulate data by sensing/detecting characteristics of the component and/or the area around the component. As such, the sensors may sense the current physical strain on the component, such as for example, the heat emitted by a component when power/electricity is flowing through it, the motion/force on a component due to the current weather conditions (e.g., wind, storms, etc.), the vegetation surrounding the component, the current outdoor temperature that the component is subject to, structural damage of the component, etc.

In some cases, the device 12 may also access characteristic data 316. In some examples, the characteristic data 316 may be stored in a cloud computing environment 314 (e.g., a remote server(s)). In some cases, the characteristic data 316 may be associated with components of the utility network 302 and a geographical region where the component and/or the utility network 302 is located. For instance, as shown in FIG. 3, the characteristic data 316 may include Property Tax Data 320 for residence and/or businesses in a particular neighborhood serviced by the utility network 302, Geological Map Data 322 for the particular neighborhood, Real-Time Weather Data 324 for the particular neighborhood, Historical Weather Data 326 for the particular neighborhood, Transformer Monitor Data 328 for transformers belonging to the utility network 302, Line Sensor Data 330 for power/distribution lines belonging to the utility network 302, and image Data 332 of component belonging to the utility network 302. It is understood that the types of the characteristic data 316 shown in FIG. 3 are intended to be illustrative only and that the characteristic data 316 may include more or less data types and can include any type of data relevant to a component of the utility network 302 or neighborhood/geographical region where the component and/or the utility network 302 may be located.

In some instances, a Model Layer 348 may track, validate, cleanse, process, and record the characteristic data 316 to generate models. For example, as shown, the Model Layer 348 may include an Energy Forecasting by Segmentation Module 334, an Energy Forecasting by Site Module 336, a Building Occupancy Prediction Module 338, a Time to Event Prediction Module 340, and an Oscillation Detection Module 342. It is understood that the modules of the Model Layer 348 are intended to be illustrative only and that the Model Layer 348 may include more or less modules and can include any type of relevant module. In some examples, the Energy Forecasting by Segmentation Module 334 may segment or group components that exhibit similar energy characteristics or behaviors, based on a detailed history of energy monitoring, plus information about component locations, demographics, and historical and real-time weather conditions experienced by the components. The Energy Forecasting by Segmentation Module 334 may use pattern recognition or any suitable method to then generate models for the components. In another example, the Energy Forecasting by Site Module 336 may identify the sites where the components are located and segment or group the sites that exhibit similar energy characteristics or behaviors, based on a detailed history of energy monitoring, plus information about site locations, demographics, and historical and real-time weather conditions experienced by the sites. The Energy Forecasting by Site Module 336 may use pattern recognition or any suitable method to then generate models for the components. In another example, the Building Occupancy Prediction Module 338 may use property information, location information, image information, sensor information, etc. to establish room relationships over time to generate occupancy models for the components. In another example, the Time to Event Prediction Module 340 may use state-of-the-art algorithms which use time until a given event as the target variable and generated models for the components. In another example, the Oscillation Detection Module 342 may use property information, location information, image information, sensor information, etc. to generate oscillation/movement/sway models for the components. In another example, the Vegetation Prediction Module 344 may use property information, location information, image information, sensor information, etc., to monitor encroaching vegetation near components, predict growth of vegetation, combine regional agricultural growth models, and identify weather patterns to generate vegetation growth models for the components.

In some cases, the device 12 may use OMS analytics to combine the set of models to create and generate operation models for the components of the utility network 302. For example, by combining the set of graphs using OMS analytics the device 12 may identify that a distribution pole has structural damage, is located in an area with heavy vegetation, and has connectors for distribution lines that frequently experience high current intensity. As such, the device 12 may generate an operation model that indicates, under the current conditions, the distribution pole is likely to stop/fail or decrease in its operational capacity within a given amount time (e.g., 1 month, 2 months, 3 months, 6 months, 1 year, 5 years, etc.). As such, the device 12 may notify and or generate the operation model for a technician/employee of the utility network on a display or the remote device(s) 14 (e.g., a field device, a smart phone, tablet computer, laptop computer, personal computer, PDA, and/or the like) that the distribution pole may fail and cause power outages. The technician may then take proper action to prevent the distribution pole from causing the power outage or repair the distribution pole to stop the power outage.

In some cases, the utility network 302 may also operate according to an MDM system. As such, sensor data sent to the device 12 may comprise the current physical strain on the components of the utility network 302. In some examples, the physical strain may cause a component to deteriorate, damage, break, and/or change its current condition such that the component may be weakened and cannot operate to its former (pre-deteriorated) capacity. In other examples, the physical strain may not affect the component and/or the component may continue to operate. Moreover, in some instances, the operation models for the components may have sets of operating and structural conditions that when met by the physical strain, may indicate a likelihood that the component may stop/fail or decrease in its operational capacity. As such, when device 12 identifies that the physical strain on a component meets or exceeds a corresponding operating or structural condition of the component, the device 12 may identify whether operation of the component is affected by the physical strain. Whether the operation of the component is affected by the physical strain, the device 12 may then update the operation model for the component. For instance, continuing with the example of the distribution pole, in some cases the distribution pole may be operatively coupled to sensors, such as for example, IR sensors, optical sensors, and accelerometers. In some examples, the IR sensors may be used to detect the temperatures of the connectors of the distribution pole due to the high-intensity current, the optical sensors and the IR sensors may be used to detect structural damage of the distribution pole, and the accelerometers may be used to detect the motion/force on the distribution lines connected to the connectors and attached to the distribution pole. Due to the structural damage and the deterioration of the connectors from the high-intensity current, the operation model indicates that a structural condition or the acceptable line sway range of the distribution lines is 0 to 0.00005 $m/s^2$. In some cases, an accelerometer may then detect that a distribution line is being swayed 0.00006 $m/s^2$. When the device 12 receives this data from the accelerometer (i.e., the device 12 identifies that the corresponding condition of the operation model for the distribution poll are met), the device may send a notification to the remote device(s) 14. However, in this case, a technician that observes the notification on the remote device(s) 14 may observe that the distribution poll did not fail and no power outages occurred. The technician may then send a report to the device 12 that upon experiencing a 0.00006 $m/s^2$ line sway, the distribution poll did not fail and no power outages occurred. In some instances, the device 12 may use the report to update the operation model for the distribution poll such that the line sway structural condition for the distribution poll is now set at 0 to 0.00006 $m/s^2$.

In another example, the accelerometer may detect that the distribution line is being swayed 0.00004 $m/s^2$ and the technician observes that a power outage has occurred due to the failure of the distribution poll. The technician may then send a report to the device 12 that upon experiencing a 0.00004 $m/s^2$ line sway, the distribution poll failed and a power outage has occurred. In some instances, the device 12 may use the report to update the operation model for the distribution poll such that the line sway structural condition for the distribution poll is now set at 0 to 0.00004 $m/s^2$. These are just a couple examples of how the device 12 can generate an operation model for a component and are not intended to limit the scope of the disclosure. As such, the device 12 can use any method to generate operation models that indicate when components are likely to stop/fail or decrease in their operational capacity.

In some cases, when the device 12 receives a report (e.g., a report from the technician), the device 12 may be capable of learning from the report without being explicitly programmed. Instead the device 12 may use the report to build logic based on the data obtained from the report. In conjunction with the characteristic data and cloud computing, described herein, the capability of the device 12 to learn from patterns in the data may improve the device's ability to analyze those big chunks of data from multiple sources. For instance, in some cases, the device 12 may be capable of discovering interesting structures in the characteristic data. In some examples, the device 12 may be capable of discovering rules that describe large portions of the characteristic data. In some instances, the device 12 may improve its ability to discover inherent groupings in the characteristic data. In any scenario, this ability to learn from the report may allow the device 12 to produce reliable, repeatable operation models and predictions and uncover "hidden insights" through historical relationships and trends in the characteristic data. As such, in some examples, the device 12 may be configured to progressively improve the likelihood of failure/likelihood of outage predictions of the operation models from the reports and/or feedback.

Figure 4A:
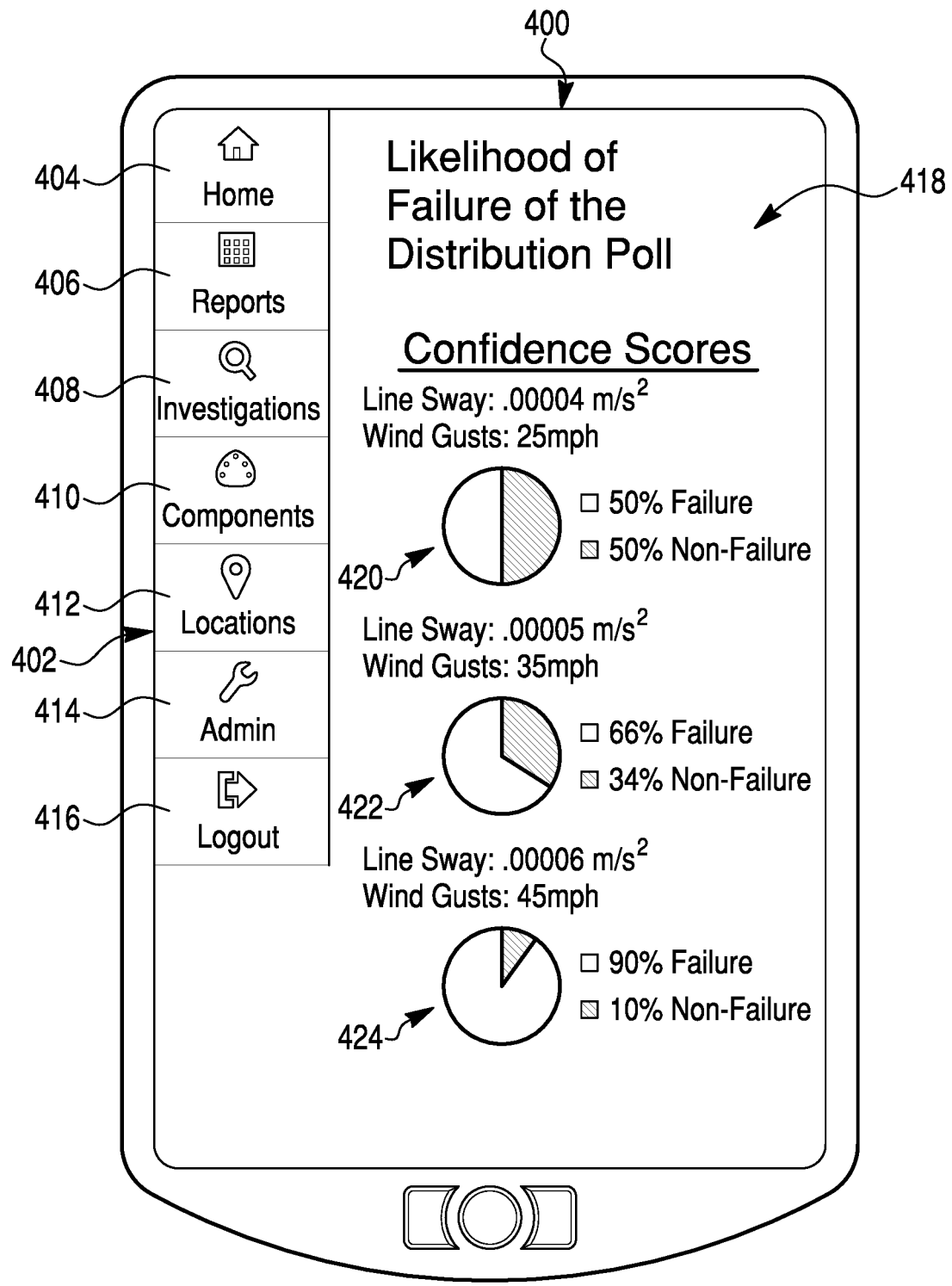
FIG. 4A is an example of an OMS Dashboard components screen.

In some instances, the device 12 may generate operation models in the form of an OMS Dashboard that gives a detailed account and predictions of the likelihood that a component may stop/fail or decrease in operational capacity. FIG. 4A depicts an illustrative OMS Dashboard 400 generated by the device 12 on a display, an external device (e.g., external device(s) 24, from FIG. 1), or the remote device(s) 14 (e.g., a smart phone, tablet computer, laptop computer, personal computer, PDA, and/or the like). In some cases, the remote device 14 may be a field device used by a technician and/or an employee of the utility premise 304. According to various embodiments, the OMS Dashboard 400 may be an integrated, simple to use dashboard. In some cases, the OMS Dashboard 400 may enable the device 12 to send notifications, alerts, provide confidence scores, geographical maps, charts, notes, investigation summaries, etc. regarding the likelihood that a component may stop/fail or decrease in operational capacity and/or the likelihood of an outage in a utility network. In some instances, the OMS Dashboard 400 may be configured with user accounts that need user passwords to navigate through templates/screens of the OMS Dashboard 400. In some examples, the OMS Dashboard 400 may configure the screens displayed based on the user/user account. For instance, the utility network 302 may span multiple areas or neighborhoods and technicians may be assigned to particular neighborhoods. As such, the OMS Dashboard 400 may limit what is displayed on the screens for a technician, having a user account, to only the neighborhoods that the technician is assigned. This is just an example of how the device 12/OMS Dashboard 400 can selectively configure the screens and is not intended to limit the scope of the disclosure. As such, the device 12/OMS Dashboard 400 can selectively configure the screens in any manner and as needed.

As shown in FIG. 4A, icons may be located on a sidebar 402 of the OMS Dashboard 400. The icons may include a home icon 404, a reports icon 406, an investigations icon 408, a components icon 410, a locations icon 412, an administration icon 414, and a logout icon 416, for example. Each icon may be selected to display their corresponding template/screen of the OMS Dashboard. In this example, as shown in FIG. 4A, the components icon 410 has been selected to display a components screen 418 showing a likelihood that the distribution poll may stop/fail or decrease in operational capacity. In some cases, the components screen 418 may provide confidence scores of whether there is a likelihood that the distribution poll may stop/fail or decrease in operational capacity. For example, as shown, the confidence score may be shown using a chart(s) 420, 422, and 424 that include a score or percentage of the likelihood that the distribution poll may fail at a given line sway and experiencing a given wind gust speed. For instance, as shown by chart 420, when a distribution line of the distribution poll has a line sway of $0.00004$ m/s$^2$ and there is a 25 mph wind gust, the distribution poll has a likelihood of failure of 50% and a likelihood of non-failure of 50%. As shown by chart 422, when a distribution line of the distribution poll has a line sway of $0.00005$ m/s$^2$ and there is a 35 mph wind gust, the distribution poll has a likelihood of failure of 66% and a likelihood of non-failure of 34%. As shown by chart 424, when a distribution line of the distribution poll has a line sway of $0.00006$ m/s$^2$ and there is a 45 mph wind gust, the distribution poll has a likelihood of failure of 90% and a likelihood of non-failure of 10%. It should be understood that such features of the components screen 418 are intended to be illustrative only and the components screen 418 may be configured in any manner and include any number of depictions of the confidence scores such as icons, bar graphs, scatter plots, thumbnails, etc. Moreover, the components screen 418 may also include any number of features, such as icons, sidebars, scroll bars, etc.

Figure 4B:
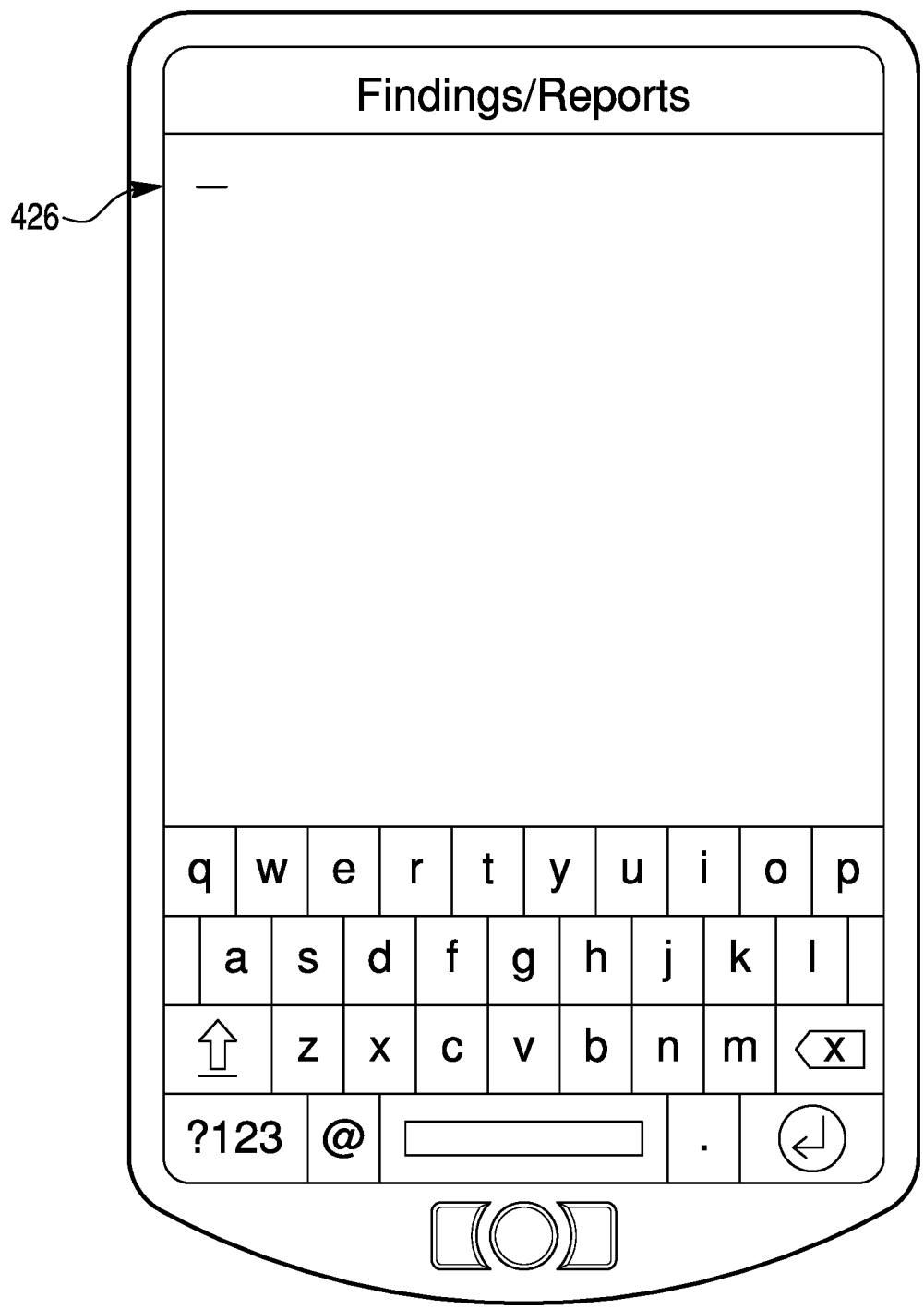
FIG. 4B is an example of a OMS Dashboard investigations screen.

Turning to FIG. 4B, in this example, the device 12 may generate an investigations screen 426 from the OMS Dashboard 400 when the investigations icon 408 (shown in FIG. 4A) is selected. In some cases, the investigations screen 426 may allow a user/technician to input and record/send a report of whether the distribution poll failed and/or caused an outage. Moreover, the user may also input a detailed description of the evidence found at or near the distribution poll, actions taken, and general notes about the distribution poll and/or the area around the distribution poll. It should be understood that such features of the investigations screen 426 are intended to be illustrative only and the investigations screen 426 may be configured in any manner that allows a user to provide a report of whether a component failed and/or caused an outage. Moreover, the investigations screen 426 may also include any number of features, such as icons, sidebars, scroll bars, graphs, thumbnails, etc.

It is understood that this is just an example of the OMS Dashboard 400. The may be many different configurations of the OMS Dashboard 400 and there may be many other ways that the device 12 may send notifications or alerts regarding the likelihood that a component may stop/fail or decrease in operational capacity and/or the likelihood of an outage in a utility network. As such, the illustrative embodiments are not intended to limit the scope of the disclosure.

Figure 5:
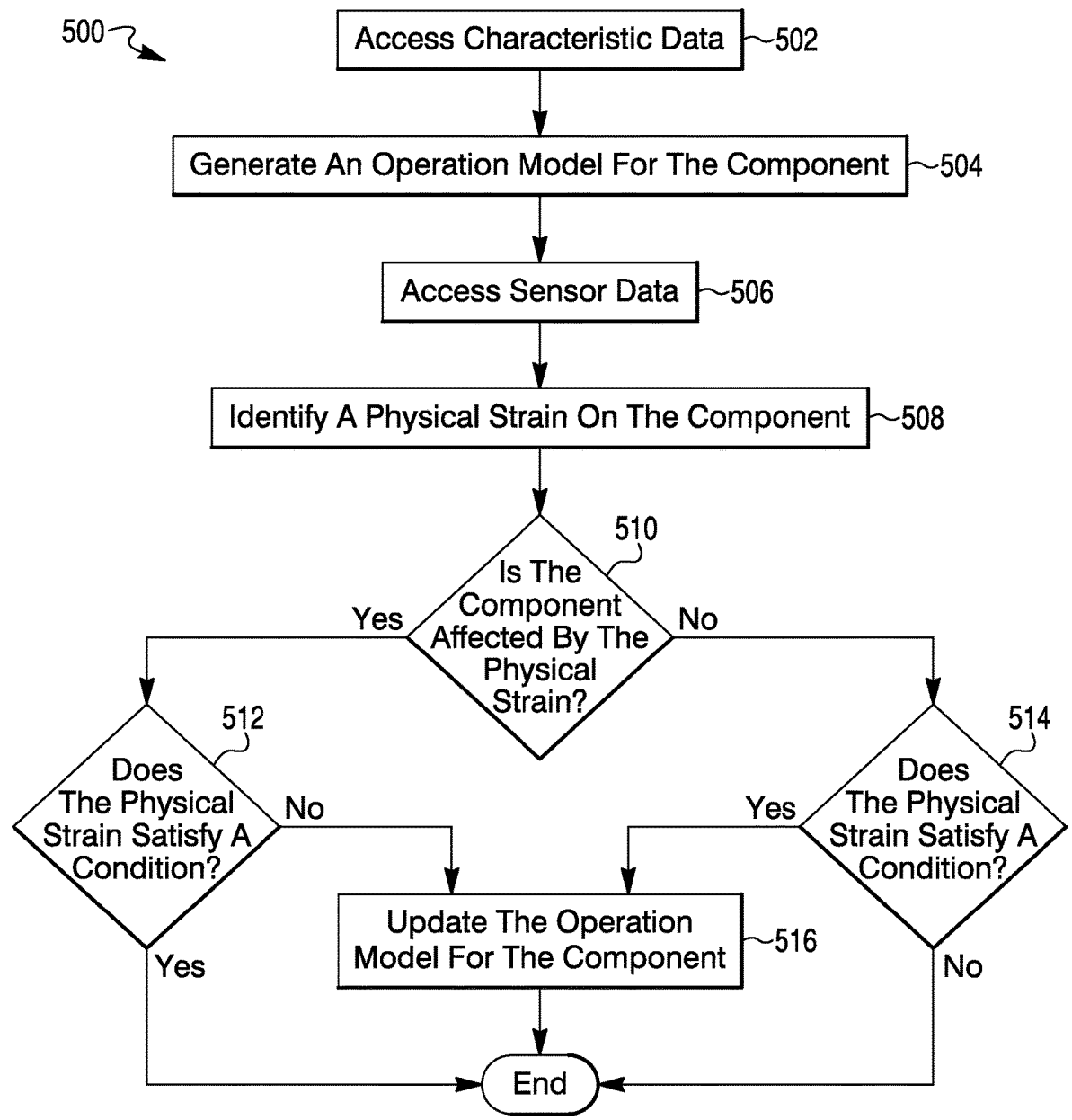
FIG. 5 is an illustrative method.

FIG. 5 depicts an illustrative method 500 for monitoring a component of a utility network. The method 500 begins at step 502, where characteristic data associated with the component and a geographical region where the component is located is accessed. In some examples, the components may include, meters, transformers, distribution lines or poles, transmission towers or lines, substations, transformer stations, etc. In some examples, the characteristic data may include Property Tax Data for residence and/or businesses in a particular neighborhood serviced by the utility network, Geological Map Data for the particular neighborhood, Real-Time Weather Data for the particular neighborhood, Historical Weather Data for the particular neighborhood, Transformer Monitor Data for transformers belonging to the utility network, Line Sensor Data for power/distribution lines belonging to the utility network, and image Data of a component belonging to the utility network. At step 504, an operation model is generated from the characteristic data for the component. In some examples, OMS analytics may be used to combine a set of models generated from the characteristic data to create and generate the operation model for the component. At step 506, sensor data for the component may be accessed. In some examples, the sensor data may be accessed from any number of sensors present in the utility network and many different kinds including, for example, accelerometers, IR sensors, temperature sensors, multimeters, pressure sensors, optical/visual sensors, etc., that may be used to sense/detect/accumulate characteristics of the component and/or the area around the component. At step 508, a physical strain on the component may be identified based on the sensor data. In some examples, the physical strain may be any energy that causes the component to deteriorate, damage, break, and/or change its current condition such that the component may be weakened. At step 510, it is identified whether operation of the component is affected by the physical strain. In some examples, the physical strain may cause the component to stop/fail or decrease in its operational capacity. If it is determined at step 510 that the operation is affected by the physical strain, at step 512, it is determined whether the physical strain satisfies an operating or structural condition from the operation model of the component. If the physical strain does satisfy an operating or structural condition from the operation model, method 500 ends. However, if the physical strain does not satisfy an operating or structural condition from the operation model, at step 516, the operation model for the component is updated and method 500 ends. In some examples, logic may be built and learned from the data obtained from the outcome of whether the component is affected by the physical strain. This ability to learn from the outcome may allow the production of reliable, repeatable operation models and predictions and uncover "hidden insights" through historical relationships and trends in the characteristic data. In some examples, the failure predictions of the operation models may be progressively improved from the outcomes and/or feedback. If it is determined at step 510 that the operation of the component is not affected by the physical strain, at step 514, it is determined whether the physical strain satisfies an operating or structural condition from the operation model of the component. If the physical strain does not satisfy an operating or structural condition from the operation model, method 500 ends. However, if the physical strain does satisfy an operating or structural condition from the operation model, at step 516, the operation model for the component is updated and method 500 ends.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code may include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Also, in the above Description, various features may be grouped together to streamline the disclosure. This should not be interpreted as intending that an unclaimed disclosed feature is essential to any claim. Rather, system subject matter may lie in less than all features of a particular disclosed embodiment. Thus, the following claims are hereby incorporated into the Description as examples or embodiments, with each claim standing on its own as a separate embodiment, and it is contemplated that such embodiments can be combined with each other in various combinations or permutations. The scope of the system should be determined with reference to the appended claims, along with the full scope of equivalents to which such claims are entitled.

What is claimed is:

1. A device for monitoring a component of a utility network, the device configured to:
   access characteristic data associated with the component and a geographical region where the component is located;
   generate an operation model for the component based on the characteristic data;
   access sensor data for the component;
   identify a physical strain on the component based on the sensor data;
   identify whether operation of the component is affected by the physical strain; and
   update the operation model for the component based on whether the operation of the component is affected by the physical strain.

2. The device of claim 1, wherein the operation model of the component has a set of operating and structural conditions.

3. The device of claim 2, further configured to:
   identify that the physical strain on the component satisfies at least one condition from the set of operating and structural conditions; and
   send a notification indicating that the at least one condition is satisfied.

4. The device of claim 2, wherein when the physical strain does not satisfy a first corresponding condition from the set of operating and structural conditions, but the operation of the component is affected by the physical strain, the first corresponding condition is adjusted and when the physical strain satisfies a second corresponding condition, but the operation of the component is not affected by the physical strain, the second corresponding condition is adjusted.

5. The device of claim 4, wherein the set of models comprises an energy forecasting model, a building occupancy prediction model, time to event prediction model, vegetation growth prediction model, and an oscillation detection model.

6. The device of claim 1, wherein the operation model indicates a likelihood of failure of the component.

7. The device of claim 6, wherein the likelihood of failure includes a confidence score.

8. The device of claim 1, wherein the characteristic data comprises geological map data, property tax data, weather data, sensor data, and image data.

9. The device of claim 1, further configured to:
   generate a set of models from the characteristic data; and
   combine the set of models to create the operation model.

10. The device of claim 1, wherein a remote server generates a set of models from the characteristic data and the device accesses the set of models from the remote device and is further configured to combine the set of models to create the operation model.

11. A system for monitoring a component of a utility network, the system comprising:
a set of sensors for accumulating sensor data; and
a device operatively coupled to the set of sensors and configured to:
access characteristic data associated with the component and a geographical region where the component is located;
generate an operation model for the component based on the characteristic data;
access the sensor data for the component from the set of sensors;
identify a physical strain on the component based on the sensor data;
identify whether operation of the component is affected by the physical strain; and
update the operation model for the component based on whether the operation of the component is affected by the physical strain.

12. The system of claim 11, wherein the operation model of the component has a set of operating and structural conditions.

13. The system of claim 12, the device further configured to:
identify that the physical strain on the component satisfies at least one condition from the set of operating and structural conditions; and
send a notification indicating that the at least one condition is satisfied.

14. The system of claim 12, wherein when the physical strain does not satisfy a first corresponding condition from the set of operating and structural conditions, but the operation of the component is affected by the physical strain, the first corresponding condition is adjusted and when the physical strain satisfies a second corresponding condition, but the operation of the component is not affected by the physical strain, the second corresponding condition is adjusted.

15. The system of claim 11, wherein the operation model indicates a likelihood of failure of the component.

16. The system of claim 11, further comprising a remote server operatively coupled to the set of the sensors and the device, and configured to generate a set of models from the characteristic data, and the device accesses the set of models from the remote server and combines the set of models to create the operation model.

17. A method for monitoring a component of a utility network, the method comprising:
accessing characteristic data associated with the component and a geographical region where the component is located;
generating an operation model for the component based on the characteristic data;
accessing sensor data for the component;
identifying a physical strain on the component based on the sensor data;
identifying whether operation of the component is affected by the physical strain; and
updating the operation model for the component based on whether the operation of the component is affected by the physical strain.

18. The method of claim 17, wherein the operation model of the component has a set of operating and structural conditions.

19. The method of claim 18, wherein when the physical strain does not satisfy a first corresponding condition from the set of operating and structural conditions, but the operation of the component is affected by the physical strain, the first corresponding condition is adjusted and when the physical strain satisfies a second corresponding condition, but the operation of the component is not affected by the physical strain, the second corresponding condition is adjusted.

20. The method of claim 17, further comprising:
generating a set of models from the characteristic data; and
combining the set of models to create the operation model.

* * * * *